(12) United States Patent
Rohlfing

(10) Patent No.: US 6,860,237 B1
(45) Date of Patent: Mar. 1, 2005

(54) BIRD PERCH

(76) Inventor: John H. Rohlfing, 509 Linda Ave., Blackwood, NJ (US) 08012

( * ) Notice: Subject to any disclaimer, the term of this patent is extended or adjusted under 35 U.S.C. 154(b) by 0 days.

(21) Appl. No.: 10/800,817

(22) Filed: Mar. 15, 2004

(51) Int. Cl.$^7$ ........................ A01K 31/12; A41D 31/08
(52) U.S. Cl. .............................. 119/537; 119/531; 2/16
(58) Field of Search ................................ 119/531, 537, 119/468; 2/16, 46, 59, 170, 309, 311, 312

(56) References Cited

U.S. PATENT DOCUMENTS

| 2,839,027 | A |   | 6/1958  | Lanza ........................ 119/537 |
| 4,959,875 | A | * | 10/1990 | Moon ............................. 2/16 |
| 5,113,533 | A | * | 5/1992  | Takada ......................... 2/170 |
| 5,331,921 | A |   | 7/1994  | vanVonno .................. 119/537 |
| 5,363,803 | A |   | 11/1994 | Serro ......................... 119/537 |
| 5,418,980 | A | * | 5/1995  | Kelly ........................... 2/170 |
| 6,450,126 | B1|   | 9/2002  | Schellenbach .............. 119/537 |

OTHER PUBLICATIONS

Protective Arm Shield Product, Copyright 2001, The Crystal Parrot.

* cited by examiner

Primary Examiner—Teri P. Luu
Assistant Examiner—Elizabeth Shaw
(74) Attorney, Agent, or Firm—Norman E. Lehrer

(57) ABSTRACT

The bird perch is to be worn about a person's upper arm and includes a generally curved, rigid band, a strap that releasably secures the band to the person's upper arm, and a wooden perch that extends generally horizontally outwardly from the band. The band fits onto the person's upper arm and includes an outer layer of rigid material and an inner layer of foam material that contacts the person's upper arm.

6 Claims, 1 Drawing Sheet

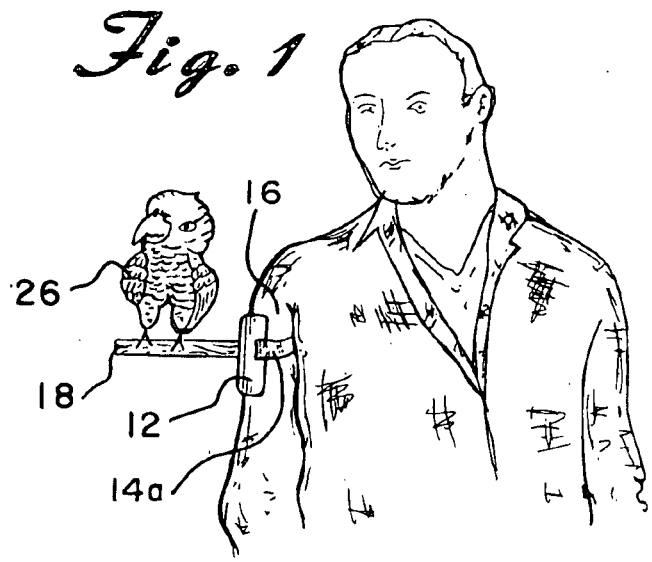
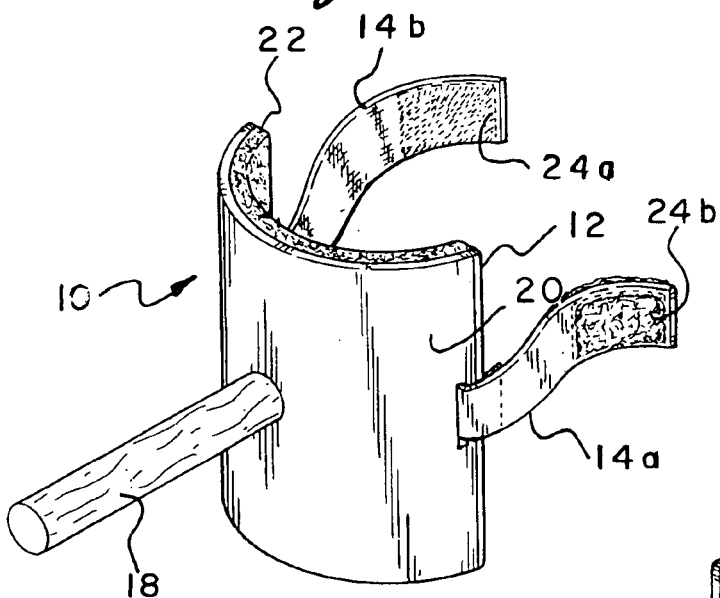
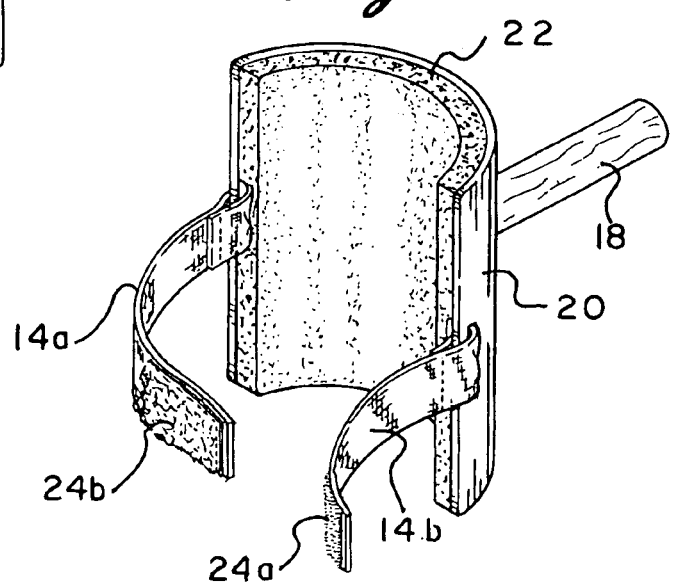

BIRD PERCH

BACKGROUND OF THE INVENTION

The present invention is directed toward a body worn perch for supporting and carrying a bird and more particularly, toward a bird perch that is worn on a person's upper arm.

Bird owners or handlers often enjoy carrying their birds, especially parrots, on their shoulders or hands. Bird owners also carry their birds in order to train or show them. There are several problems, however, with carrying a bird on one's shoulders. For example, the bird tends to dig its claws into the person's shoulder in an effort to gain proper footing. Also, when the bird is close to the person's face there is a chance that the bird will peck, scratch, or bite the person's face, ears, head, etc. thereby causing pain or discomfort to the person.

If a bird is carried by a person in his or her hands, the bird may bite or scratch the person's hand. Also, the person cannot keep his or her hands free when carrying a bird. This may be uncomfortable or awkward for the person as well as for the bird. Furthermore, carrying a bird on the hand tends to be unsanitary with respect to bird droppings.

In order to overcome some of the problems discussed above, covers that protect one's shoulders have been designed and are available in the market. However, these covers do not prevent a bird from pecking at or biting the bird handler's face.

Using gloves while carrying a bird in one's hands is also a possible solution. But again, carrying a bird in one's hands may still be rather awkward and does not allow the person to use his or her hands for other purposes.

Other attempts to provide body worn carriers or perches for birds have been made. U.S. Pat. No. 6,450,126 to Schellenbach, for example, discloses a body mountable bird perch that includes a vest with a wooden perch secured to the vest. However, the perch is located on the person's shoulder so that the person's face, head, etc. are not protected from pecking or biting by the bird.

The Crystal Parrot (www.crystal-parrot.com/Armsheild.html) advertises a protective arm shield with straps that secure the band to the person's arm and which includes a perch for a bird. The arm shield, however, is secured to the person's lower arm which may be an awkward position for holding the bird. That is, the person must hold his or her arm away from his or her body which may become uncomfortable after a period of time.

Therefore, a need exists for a perch for a bird that may be worn by a person in a safe and comfortable manner.

SUMMARY OF THE INVENTION

The present invention is designed to overcome the deficiencies of the prior art discussed above. It is an object of the present invention to provide a comfortable bird perch that may be worn by a person handling a bird.

It is another object of the present invention to provide a bird perch that is worn by a person and that protects the person handling the bird.

In accordance with the illustrative embodiments demonstrating features and advantages of the present invention, there is provided a bird perch worn about a person's upper arm that essentially includes a generally curved, rigid band, means for releasably securing the band to the person's upper arm, and a wooden perch extending generally horizontally outwardly from the band. The band fits onto the person's upper arm and includes an outer layer of rigid material and an inner layer of foam material that contacts the person's upper arm. The releasable securing means is attached to the band and includes a strap that fits about the person's upper arm and a hook and loop fastener that secures the strap around the person's arm.

Other objects, features, and advantages of the invention will be readily apparent from the following detailed description of a preferred embodiment thereof taken in conjunction with the drawings.

BRIEF DESCRIPTION OF THE DRAWINGS

For the purpose of illustrating the invention, there is shown in the accompanying drawings one form that is presently preferred; it being understood that the invention is not intended to be limited to the precise arrangements and instrumentalities shown.

FIG. 1 illustrates the bird perch of the present invention worn by a person;

FIG. 2 is a front perspective view of the bird perch of the present invention; and FIG. 3 is a rear perspective view of the bird perch of the present invention.

DETAILED DESCRIPTION OF THE PREFERRED EMBODIMENT

Referring now to the drawings in detail wherein like reference numerals have been used throughout the various figures to designate like elements, there is shown in FIGS. 1, 2 and 3 a bird perch constructed in accordance with the principles of the present invention and designated generally as 10.

The bird perch 10 of the present invention essentially includes a generally curved, and preferably rigid band 12, means 14a and 14b for releasably securing the band 12 to the person's upper arm 16, and a perch 18 extending generally horizontally outwardly from the band 12. The band 12 fits onto the person's upper arm 16 and includes an outer layer 20 of relatively rigid material and an inner layer 22 of foam or similar material that contacts the person's upper arm 16 and cushions it. (See FIG. 3.)

The outer layer 20 of the band 12 may be made of metal or plastic or any similar material that will maintain its shape and is capable of supporting the perch 18. Furthermore, the band 12 may be longer than shown if desired and can be made to extend further around the person's arm.

The releasable securing means 14a and 14b are preferably in the form of adjustable straps that are attached to the band 12 and secured about the person's arm via a hook and loop type fasteners 24a and 24b or similar securing means. (See FIG. 2.) While only one set of straps is shown, it should be apparent that two or more sets of straps could be utilized. It may also be possible to utilize a continuous elastic band in lieu of the straps.

The perch 18 may be made from wood or other material known in the art that allows a bird 26 to sit or stand comfortably thereon. It is preferably round and is attached to the band through the use of mechanical means such as a wood screw or the like passing from the inside of the band 12, through the thickness of the band and into the axial center of the perch 18. Other means such as glue could also be used to secure the perch to the band. It is also within the scope of the invention to mold the band 12 and the perch 18 together out of plastic as a single unit.

The present invention allows a bird handler's face and head to be protected from the bird while it is being held as the bird is not sitting on the person's shoulder. Furthermore, since the bird is not being carried in the handler's hands, the invention also allows the person to have free use of his or her hands for other purposes. Even further, the present invention allows the bird to have a steady, comfortable perch rather that a person's shoulder which may be painful to the person and uncomfortable to the bird.

The present invention may be embodied in other specific forms without departing from the spirit or essential attributes thereof and accordingly, reference should be made to the appended claims rather than to the foregoing specification as indicating the scope of the invention.

I claim:

1. A bird perch worn on a person's upper arm comprising:
   a generally curved relatively rigid band;
   means for releasably securing said band to the person's upper arm; and
   a perch extending generally horizontally outwardly from said band.

2. The bird perch worn on a person's arm of claim 1 wherein said perch is comprised of wood.

3. The bird perch worn on a person's upper arm of claim 1 wherein said band includes a foam layer adapted to contact the person's upper arm.

4. The bird perch worn on a person's upper arm of claim 1 wherein said releasable securing means includes strap means adapted to fit around the person's upper arm.

5. The bird perch worn on a person's upper arm of claim 4 wherein said strap means includes a pair of straps secured to said band.

6. The bird perch worn on a person's upper arm of claim 5 wherein said strap means include hook and loop fasteners for securing them to each other.

* * * * *